US012785205B2

(12) United States Patent
Xu

(10) Patent No.: US 12,785,205 B2
(45) Date of Patent: Nov. 3, 2026

(54) TOP COVER COMPRISING EXPLOSION-PROOF VALVE FOR BATTERY, BATTERY AND ENERGY STORAGE DEVICE

(71) Applicant: Hithium Tech HK Limited, HongKong (CN)

(72) Inventor: Weidong Xu, Xiamen (CN)

(73) Assignee: Hithium Tech HK Limited, HongKong (CN)

(*) Notice: Subject to any disclaimer, the term of this patent is extended or adjusted under 35 U.S.C. 154(b) by 771 days.

(21) Appl. No.: 17/970,502

(22) Filed: Oct. 20, 2022

(65) Prior Publication Data

US 2023/0216135 A1 Jul. 6, 2023

(30) Foreign Application Priority Data

Dec. 30, 2021 (CN) ......................... 202123432364.1

(51) Int. Cl.
*H01M 50/342* (2021.01)
*H01M 50/15* (2021.01)

(52) U.S. Cl.
CPC ....... *H01M 50/3425* (2021.01); *H01M 50/15* (2021.01); *H01M 2200/20* (2013.01)

(58) Field of Classification Search
CPC ............. H01M 50/3425; H01M 50/15; H01M 2200/20
See application file for complete search history.

(56) References Cited

U.S. PATENT DOCUMENTS

2022/0384906 A1* 12/2022 Liu ..................... H01M 50/186

FOREIGN PATENT DOCUMENTS

| | | | | | |
|---|---|---|---|---|---|
| CN | 207021326 U | * | 2/2018 | | |
| CN | 207409523 U | * | 5/2018 | | |
| CN | 111490212 A | * | 8/2020 | .......... | H01M 50/183 |
| CN | 213584066 U | * | 6/2021 | | |
| JP | 2013168293 A | * | 8/2013 | .............. | B60L 50/64 |

OTHER PUBLICATIONS

EPO machine generated English translation of CN-207409523-U (Year: 2018).*
EPO machine generated English translation of CN-207021326-U (Year: 2018).*
EPO machine generated English translation of CN-213584066-U (Year: 2021).*
EPO machine generated English translation of JP-2013168293-A (Year: 2013).*
EPO machine generated English translation of CN-111490212-A (Year: 2020).*

* cited by examiner

*Primary Examiner* — Kimberly Wyluda

(57) ABSTRACT

Provided are a top cover for a battery, a battery and an energy storage device. The top cover for the battery includes a mounting sheet and an explosion-proof valve. The mounting sheet has an opening defined thereon. The explosion-proof valve includes a valve body, an explosion-proof diaphragm and a valve cover. The valve body is mounted in the opening, and the valve body has a ventilation groove defined on an upper surface thereof. The valve cover is mounted on the upper surface of the valve body and configured to partially cover the ventilation groove. The explosion-proof diaphragm is mounted on a lower surface of the valve body. A cavity is defined by the valve body, the explosion-proof diaphragm and the valve cover and is in communication with outside through the ventilation groove.

15 Claims, 4 Drawing Sheets

TOP COVER COMPRISING EXPLOSION-PROOF VALVE FOR BATTERY, BATTERY AND ENERGY STORAGE DEVICE

CROSS-REFERENCE TO RELATED APPLICATIONS

The present application is based on and claims priority to Chinese Patent Application No. 202123432364.1, filed on Dec. 30, 2021, the entire content of which is incorporated herein by reference.

TECHNICAL FIELD

Embodiments of the present disclosure relate to the field of battery technologies, and more particularly, to a top cover for a battery, a battery and an energy storage device.

BACKGROUND

With the application of a battery, people have put forward higher and higher requirements for safety of the battery. When the battery is under an abnormal condition, such as short circuit caused by an external impact, the short circuit will increase a pressure inside a cell of the battery. When the pressure inside the cell rises to a certain level, an explosion would be generated, which is dangerous.

In the related art, in order to ensure the safety of the battery, an explosion-proof valve is usually provided. However, a space between an explosion-proof diaphragm and a valve cover of the explosion-proof valve is prone to generate a pressure difference between inside and outside, resulting in an inaccurate initiation pressure, thereby affecting an explosion proof performance of the explosion-proof valve.

SUMMARY

Embodiments of the present disclosure provide a top cover for a battery, a battery and an energy storage device.

A top cover for a battery according to embodiments of the present disclosure includes: a mounting sheet and an explosion-proof valve. The mounting sheet has an opening defined therein. The explosion-proof valve includes a valve body, an explosion-proof diaphragm, and a valve cover. The valve body is mounted in the opening and has a ventilation groove defined on an upper surface thereof. The valve cover is mounted on the upper surface of the valve body and configured to partially cover the ventilation groove. The explosion-proof diaphragm is mounted on a lower surface of the valve body. A cavity is defined by the valve body, the explosion-proof diaphragm and the valve cover and is in communication with outside through the ventilation groove.

In some embodiments, the valve body has an annular structure and includes an inner ring and an outer ring. The inner ring is in communication with the outer ring through the ventilation groove.

In some embodiments, a distance between a peripheral edge of the valve cover and the outer ring is 1.5 mm.

In some embodiments, the ventilation groove is substantially V-shaped.

In some embodiments, the ventilation groove has a first surface and a second surface that are perpendicular to each other. The first surface includes a first edge and a second edge that extend in a length direction of the ventilation groove, and the second surface includes a third edge and a fourth edge that extend in the length direction of the ventilation groove. The first edge is parallel to the third edge, and the second edge abuts with the fourth edge.

In some embodiments, the ventilation groove has a maximum sectional length of 0.2 mm in a width direction of the ventilation groove and a depth of 0.1 mm.

In some embodiments, the ventilation groove has a first ventilation end defined in the inner ring of the valve body to be in communication with the cavity and a second ventilation end located between the peripheral edge of the valve cover and the outer ring of the valve body.

In some embodiments, the valve body with the ventilation groove is of an integrally formed structure.

A battery according to embodiments of the present disclosure includes a housing and the top cover for the battery as described in the above embodiments. The top cover for the battery is disposed on the housing.

An energy storage device according to embodiments of the present disclosure includes the battery as described in the above embodiment.

In the top cover for the battery, the battery and the energy storage device according to the embodiments of the present disclosure, by partially covering the ventilation groove with the valve cover, a pressure of inside of the cavity can be balanced, which can ensure a pressure difference between the inside and outside of the cavity, thereby ensuring accurate initiation pressure and effectiveness of the burst pressure of the explosion-proof valve and improving explosion-proof performance of the explosion-proof valve.

Additional aspects and advantages of the present disclosure will be set forth, in part, from the following description, and will be in part apparent from the following description, or learned by practice of the disclosure.

BRIEF DESCRIPTION OF DRAWINGS

The above and/or additional aspects and advantages of the present disclosure will become apparent and readily understood from the following description of embodiments in conjunction with the accompanying drawings, in which.

Figure 1:
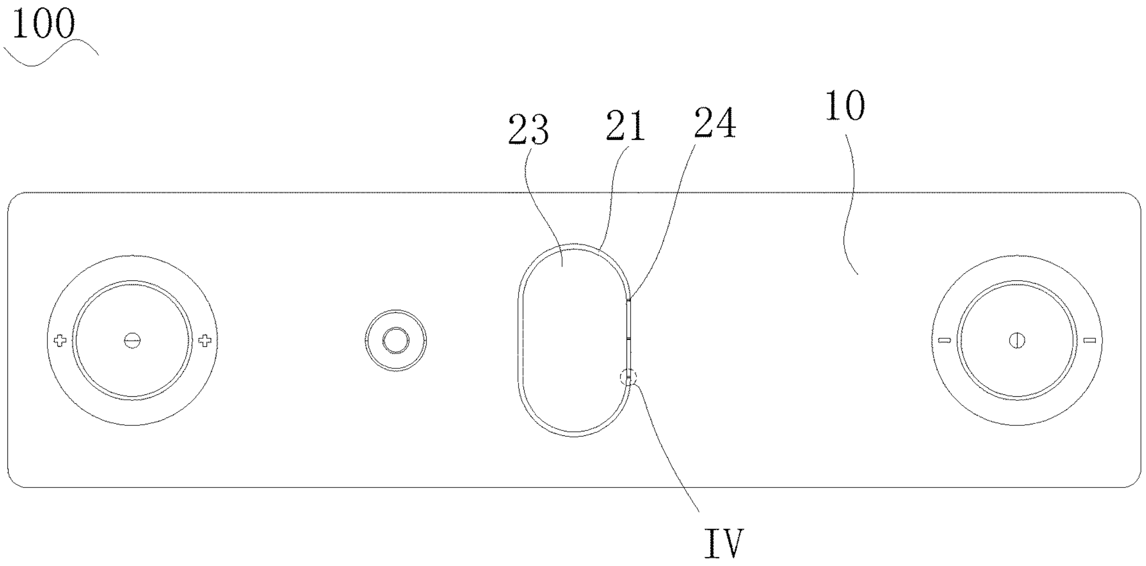
FIG. 1 is a schematic structural view of a top cover for a battery according to an embodiment of the present disclosure.
Figure 2:
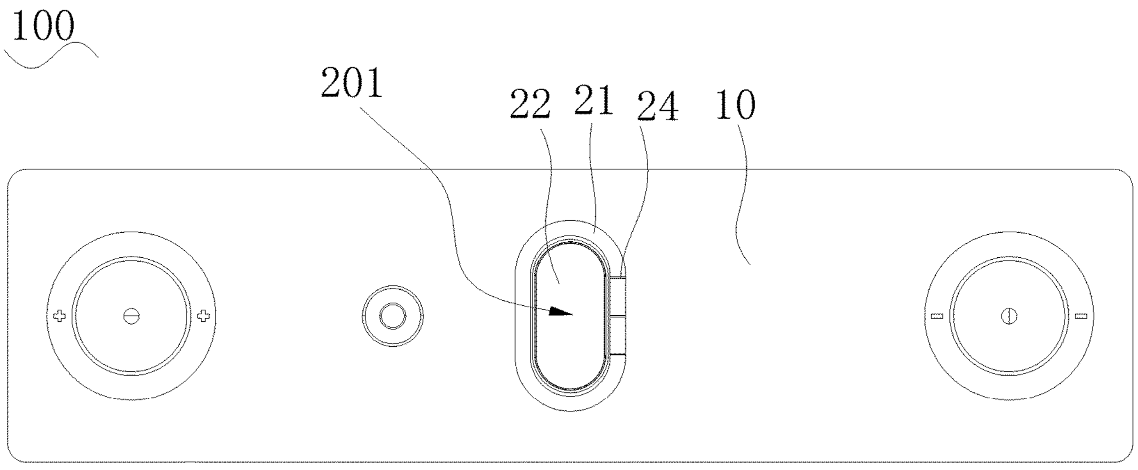
FIG. 2 is a schematic partial structural view of a top cover for a battery according to an embodiment of the present disclosure.
Figure 3:
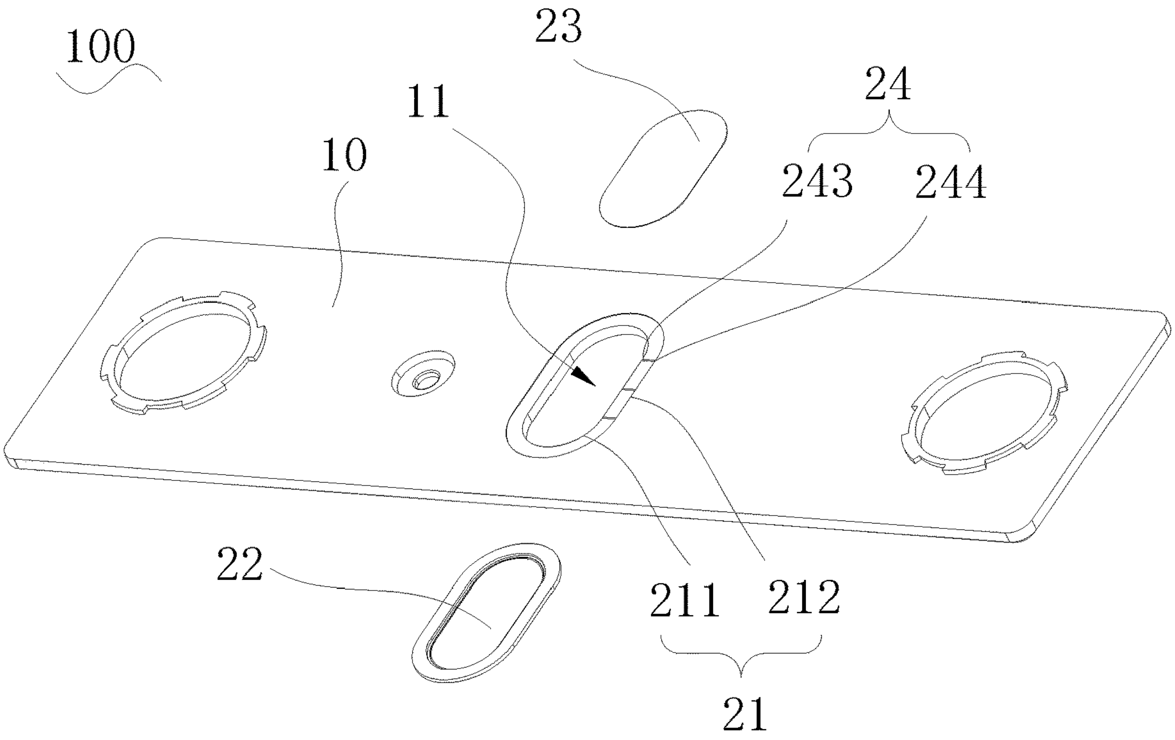
FIG. 3 is a schematic exploded structural view of a top cover for a battery according to an embodiment of the present disclosure.
Figure 4:
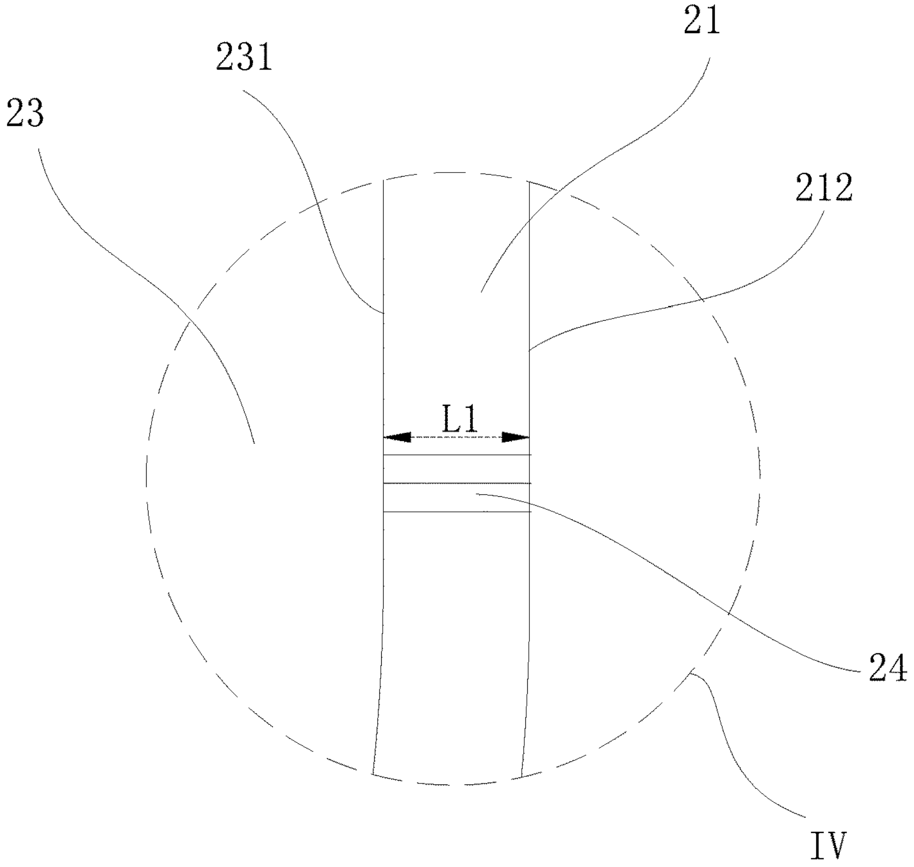
FIG. 4 is a schematic enlarged view of part IV in FIG. 1.

REFERENCE SIGNS top cover for battery 100, mounting sheet 10, opening 11, explosion-proof valve 20, valve body 21, inner ring 211, outer ring 212, cavity 201, explosion-proof diaphragm 22, valve cover 23, peripheral edge 231, ventilation groove 24, first surface 241, first edge 2411, second edge 2412, second surface 242, third edge 2421, fourth edge 2422, first ventilation end 243, second ventilation end 244.

DESCRIPTION OF EMBODIMENTS

Embodiments of the present disclosure are described in detail below, examples of which are illustrated in the accompanying drawings, wherein the same or similar reference signs refer to the same or similar elements or elements having the same or similar functions throughout. The embodiments described below with reference to the accompanying drawings are exemplary, and only used to explain the embodiments of the present disclosure, rather than being construed as limitations on the embodiments of the present disclosure.

In the embodiments of the present disclosure, the first feature being "on," "over," "above" or "under," "beneath," "below" the second feature may include the first and second features being in direct contact with each other, or the first and second features being in contact with each other through additional features therebetween, rather than in direct contact with each but are. In addition, the first feature being "above," "over," and "on" the second feature includes the first feature being directly above and obliquely above the second feature, or simply means that the first feature has a higher level than the second feature. The first feature being "below," "under," and "beneath" the second feature includes the first feature being directly below and obliquely below the second feature, or simply means that the first feature has a lower level than the second feature.

The following disclosure provides many different embodiments or examples for implementing different structures of embodiments of the disclosure. In order to simplify the disclosure of the embodiments of the present disclosure, the components and arrangements of specific examples are described below. Of course, they are merely examples and are not intended to limit the disclosure. The embodiments of the present disclosure may repeat reference signs and/or reference letters in various instances for the purpose of simplicity and clarity, and do not in themselves indicate the relationship between the various embodiments and/or arrangements as discussed. In addition, the embodiments of the present disclosure provide examples of various specific processes and materials. However, one of ordinary skill in the art will recognize that the application of other processes and/or the use of other materials.

Please refer to FIG. 1 to FIG. 4, a top cover for a battery 100 according to embodiments of the present disclosure includes a mounting sheet 10 and an explosion-proof valve 20. The mounting sheet 10 has an opening 11 defined therein. The explosion-proof valve 20 includes a valve body 21, an explosion-proof diaphragm 22 and a valve cover 23. The valve body 21 is mounted in the opening 11, and the valve body 21 has a ventilation groove 24 defined on an upper surface thereof. The valve cover 23 is mounted on an upper surface of the valve body 21, and is configured to partially cover the ventilation groove 24. The explosion-proof diaphragm 22 is mounted on a lower surface of the valve body 21. A cavity 201 is defined by the valve body 21, the explosion-proof diaphragm 22 and the valve cover 23 and is in communication with outside through the ventilation groove 24.

In the top cover for the battery 100 according to the embodiments of the present disclosure, a pressure in the cavity 201 can be balanced by partially covering the ventilation groove 24 with the valve cover 23. Thus, it is possible to ensure a pressure difference between an interior of the cavity 201 and the outside and an accurate initiation pressure, thereby ensuring an effectiveness of a burst pressure of the explosion-proof valve 20 and improving an explosion-proof performance of the explosion-proof valve 20.

In some embodiments, the top cover for the battery 100 includes a mounting sheet 10, and the mounting sheet 10 may include a light aluminum sheet. The mounting sheet 10 according to the embodiments of the present disclosure is illustrated by taking the light aluminum sheet as an example to facilitate understanding of the implementation of the present disclosure, rather than being construed as limitations on the present disclosure.

In some embodiments, a sectional surface, a post hole, a liquid injection hole and the like may be formed on the light aluminum sheet by performing punching, perforating, cutting process or the like on the light aluminum sheet. The mounting sheet 10 according to the embodiments of the present disclosure may be the light aluminum sheet, and an opening 11 is formed on the light aluminum sheet by punching, perforating, cutting, or the like. It is worth mentioning that, the opening 11 and the light aluminum sheet may also be integrally formed by a mold, which is not limited herein.

The opening 11 may have various shapes such as an elliptical, circular, rectangular, square shape or other shapes, which are not limited herein, as long as the opening 11 and the explosion-proof valve 20 can be matched with each other and installed together. A design of the shape of the opening 11 according to the embodiments of the present disclosure is illustrated by taking an elliptical shape as an example.

The valve body 21 may be disposed on the mounting sheet 10 by welding, gluing, or the like. A side peripheral edge of the valve body 21 is abutted against an inner wall of the opening 11. In this way, a tight connection can be achieved. In an embodiment, the valve body 21 includes an upper surface and a lower surface opposite to each other, and the mounting sheet 10 includes an upper surface and a lower surface. The upper surface of the valve body is flush with the upper surface of the mounting sheet, and the lower surface of the valve body is flush with the lower surface of the mounting sheet, so that the valve body 21 and the mounting sheet 10 are flatter and more beautiful, and the valve body 21 is not easily damaged or dropped due to bumping.

The upper surface of the valve body 21 has at least one ventilation grooves 24 defined therein, and the at least one ventilation groove 24 may include 1, 2, 3, 4 or more than 4 ventilation grooves 24, which is not limited herein. In an embodiment, the at least one ventilation groove 24 may include three ventilation grooves 24 that are identical with each other in shape and specification. The three ventilation grooves 24 are arranged in parallel on the upper surface of the valve body 21. An interval distance between the three ventilation grooves 24 may be the same to or different from each other, which is not limited herein. In this way, an effect of balancing an internal pressure of the plurality of ventilation grooves 24 is stronger, which ensures the effectiveness of the burst pressure of the explosion-proof valve 20.

The upper surface of the valve body 21 is also covered with the valve cover 23 to partially cover the ventilation groove 24. A cavity 201 is defined by the valve body 21, the explosion-proof diaphragm 22 and the valve cover 23. In this way, the cavity 201 is capable of being in communication with outside through the ventilation groove 24, so as to ensure the pressure difference between the inside of the cavity 201 and the outside. The valve cover 23 may be an aluminum sheet and may be connected to the upper surface of the valve body 21 by means of laser welding or the like. The ventilation groove 24 is equivalent to an air flow channel for communicating the cavity 201 with the outside.

The lower surface of the valve body 21 is connected to the explosion-proof diaphragm 22. In an embodiment, the explosion-proof diaphragm 22 may be an aluminum sheet, and may be connected to the lower surface of the valve body 21 by means of laser welding or the like. The laser welding can allow the explosion-proof diaphragm 22 to be securely fitted on the valve body 21, which can prevent a gap from being generated at a connection between the explosion-proof diaphragm 22 and the valve body 21, thereby avoiding a cell electrolyte from flowing out through the explosion-proof valve 20.

Referring to FIG. 3 again, in some embodiments, the valve body 21 has an annular structure and includes an inner ring 211 and an outer ring 212 in communication with the outer ring 212 through the ventilation groove 24.

In some embodiments, the valve body 21 having an annular structure includes an inner ring 211 and an outer ring 212. The inner ring 211 and the outer ring 212 of the valve body 21 may be understood as two concentric rings. The outer ring 212 has a diameter greater than a diameter of the inner ring 211. The valve body 21 having the annular structure is simple to be manufactured, which can further simplify manufacturing process and save production cost. In addition, the valve body 21 having the annular structure is connected to the mounting sheet 10 with a large force, and thus the valve body 21 can be firmly fitted on the mounting sheet 10. Therefore, it is possible to prevent the valve body 21 from being separated from the mounting sheet 10, thereby enhancing position stability of the explosion-proof valve 20.

In some embodiments, a distance between a peripheral edge 231 of the valve cover 23 and the outer ring 212 is 1.5 mm.

In an embodiment, the valve cover 23 includes a peripheral edge 231 and is disposed on the upper surface of the valve body 21. The valve cover 23 is configured to cover the inner ring 21. The distance between the peripheral edge 231 of the valve cover 23 and the outer ring 212 may be L1. In some embodiments, the distance between the peripheral edge 231 of the valve cover 23 and the outer ring 212 is 1.5 mm. That is, L1 is equal to 1.5 mm. In some embodiments, the distance (L1) of 1.5 mm between the peripheral edge 231 of the valve cover 23 and the outer ring 212 is a preferred distance obtained by analyzing and summarizing many experimental data in the present disclosure, which is not limited herein. In a case where L1 is equal to 1.5 mm, it shows advantages of ensuring pressure balance and connection stability.

In some embodiments, since the top covers for the battery 100 are different from each other in size and specification, the distance between the peripheral edge 231 of the valve cover 23 and the outer ring 212 may also be other values. In some embodiments, the distance between the peripheral edge 231 of the valve cover 23 and the outer ring 212 may be proportional to a size and a specification of the explosion-proof valve 20, which is not limited herein. In some embodiments, the distance between the peripheral edge 231 of the valve cover 23 and the outer ring 212 may be 0.5 mm, 1.0 mm, 1.5 mm, 1.7 mm, 2.2 mm, 3.0 mm, etc., which is not limited herein. It should be noted that the above specific examples and numerical values are merely for the convenience of describing the embodiments of the present disclosure, and should not be construed as limitations on the present disclosure.

Figure 5:
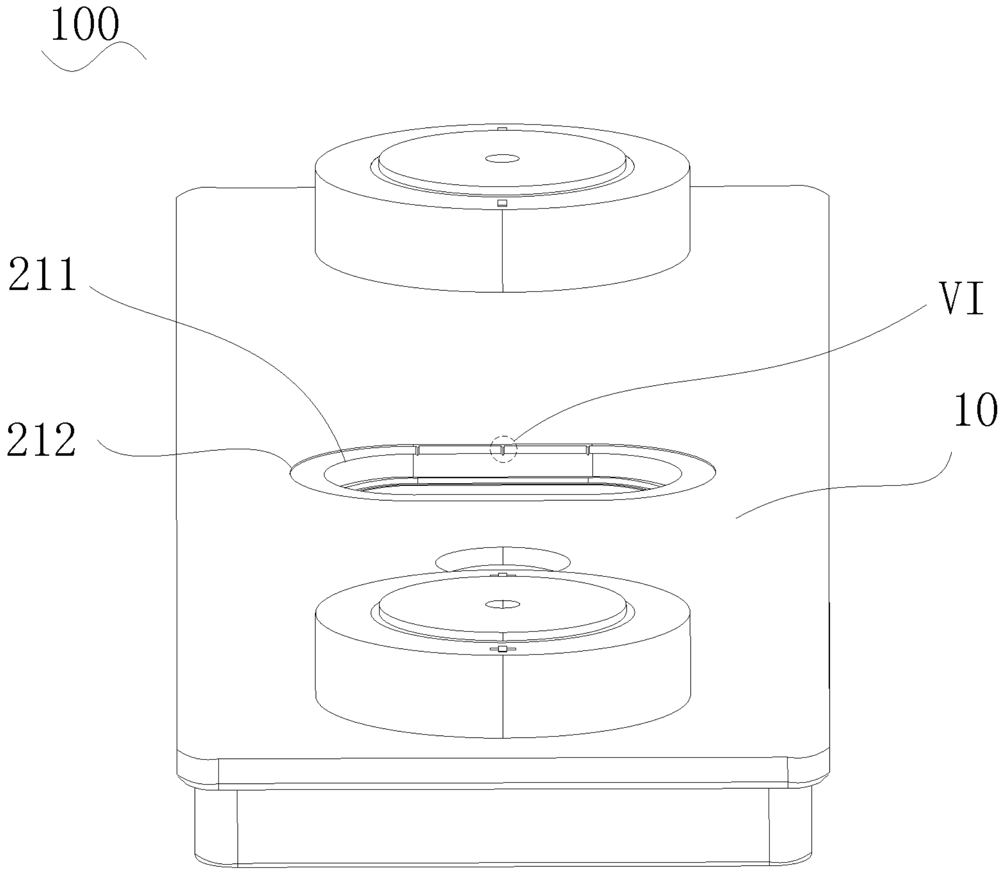
FIG. 5 is another schematic structural view of a top cover for a battery according to an embodiment of the present disclosure.
Figure 6:
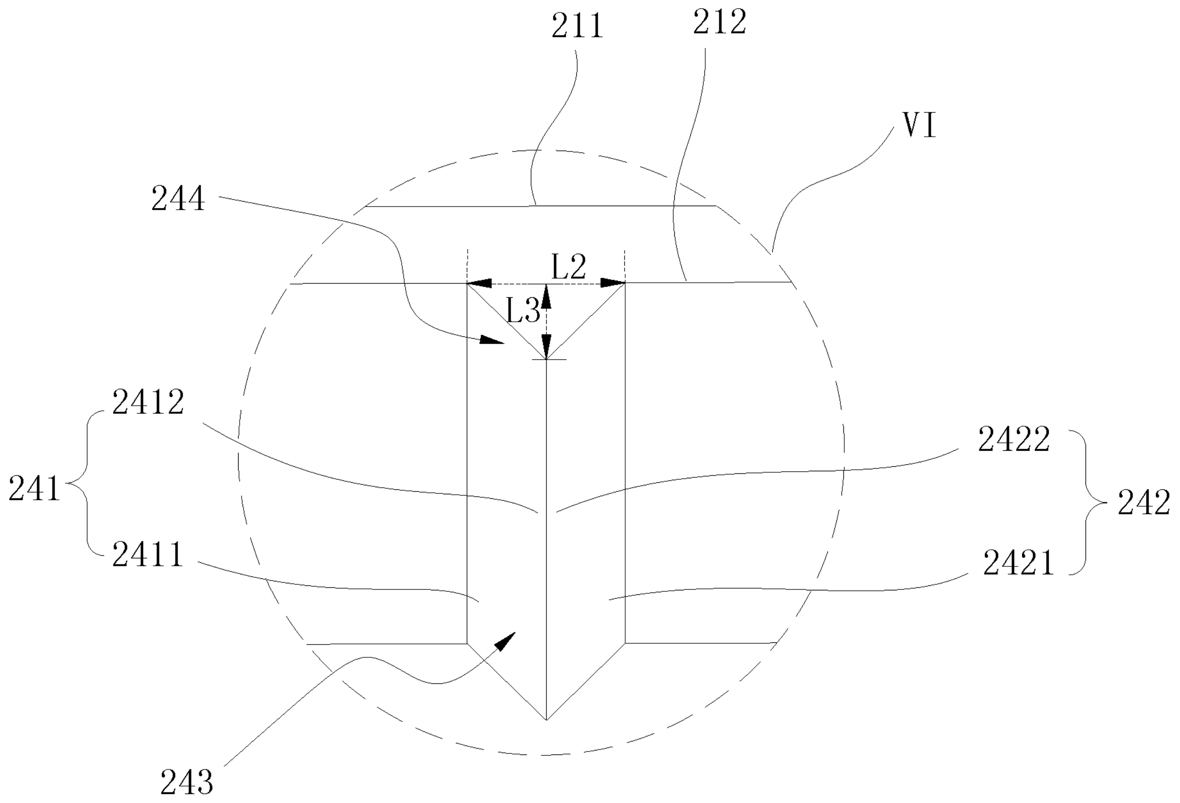
FIG. 6 is a schematic enlarged view of part VI in FIG. 5.

Please refer to FIG. 5 and FIG. 6, in some embodiments, the ventilation groove 24 is substantially V-shaped.

In some embodiments, the ventilation groove 24 may have various shapes such as an arcuated shape, a semicircular, rectangular, square, V-shape, and the like, as long as the ventilation groove 24 can be formed as an airflow channel, which is not limited herein. The ventilation groove 24 according to the embodiments of the present disclosure is designed into a substantial V-shape. In this way, the ventilation groove 24 according to the embodiments of the present disclosure is illustrated by taking the V-shape as an example.

Referring to FIG. 6 again, in some embodiments, the ventilation groove 24 has a first surface 241 and a second surface 242 that are perpendicular to each other. The first surface 241 includes a first edge 2411 and a second edge 2412 that extend in a length direction of the ventilation groove, and the second surface 242 includes a third edge 2421 and a fourth edge 2422 that extend in the length direction of the ventilation groove. The first edge 2411 is parallel to the third edge 2421, and the second edge 2412 abuts with the fourth edge 2422.

In some embodiments, the ventilation groove 24 is substantially V-shaped. The V-shaped ventilation groove 24 includes a first surface 241 and a second surface 242. The first surface 241 and the second surface 242 can guide an airflow and are easy to be formed, which can simplify the production process. The first surface 241 and the second surface 242 are perpendicular to each other. That is, an included angle between the first surface 241 and the second surface 242 is 90°. In some embodiments, the included angle between the first surface 241 and the second surface 242 may be 30°, 60°, 90°, 120°, or the like. The embodiments of the present disclosure are illustrated by taking an example where the included angle between the first surface 241 and the second surface 242 is 90°, which is for the convenience of understanding the implementation of the present disclosure, and should not be construed as a limitation on the present disclosure. The first edge 2411 is parallel to the third edge 2421, and the second edge 2412 abuts with the fourth edge 2422.

Referring again to FIGS. 4 and 6, in some embodiments, the ventilation groove 24 has a maximum sectional length of 0.2 mm in a width direction of the ventilation groove and a depth of 0.1 mm.

In some embodiments, a distance between the first edge 2411 and the third edge 2421 may be understood as the maximum sectional length of the ventilation groove 24 in the width direction of the ventilation groove, and the maximum sectional length of the ventilation groove 24 in the width direction of the ventilation groove may be L2. In some embodiments, the maximum sectional length of the ventilation groove 24 in the width direction of the ventilation groove is 0.2 mm. That is, L2 is equal to 0.2 mm. In some embodiments, the maximum sectional length (L2) of 0.2 mm of the ventilation groove 24 in the width direction of the ventilation groove is a preferred length obtained by analyzing and summarizing many experimental data in the present disclosure. In the case where L2 is equal to 0.2 mm, it shows advantages of ensuring pressure balance and connection stability.

The depth of 0.1 mm of the ventilation groove 24 may be understood as a height of the ventilation groove 24, and the depth of the ventilation groove 24 may be L3. In some embodiments, the depth of the ventilation groove 24 is 0.1 mm. That is, L3 is equal to 0.1 mm. In some embodiments, the depth (L3) of 0.1 mm of the ventilation groove 24 is 0.1 mm is a preferred depth obtained by analyzing and summarizing may experimental data in the present disclosure. In the case where L3 is equal to 0.2 mm, it shows advantages of ensuring pressure balance and connection stability.

In some embodiments, the ventilation groove 24 has a first ventilation end 243 defined in the inner ring 212 of the valve body 21 to be in communication with the cavity 201 and a second ventilation end 244 located between the peripheral edge 231 of the valve cover 23 and the outer ring 212 of the valve body 21.

In some embodiments, the first ventilation end 243 is in communication with the cavity 201 and the second ventilation end 244, and the second ventilation end 244 is exposed to the outside. In this way, the first ventilation end 243 and the second ventilation end 244 can ensure pressure difference between inside and outside of the cavity 201, and the airflow can thus flow through the ventilation groove 24.

In some embodiments, the first ventilation end 243 and the second ventilation end 244 of the ventilation groove 24 are both disposed on the upper surface of the valve body 21. The first ventilation end 243 is flush with the inner ring 211, and the second ventilation end 244 is flush with the outer ring 212. The valve cover 23 is configured to partially cover the ventilation groove 24, and the second ventilation end 244 is located between the peripheral edge 231 of the valve cover 23 and the outer ring 212 and is exposed to outside. In this way, the pressure balance inside the cavity 201 can be achieved, and the pressure difference between the inside and the outside of the cavity 201 can be ensured.

In another embodiment, the first ventilation end 243 of the ventilation groove 24 may be defined in the inner ring 211 of the valve body 21. That is, the first ventilation end 243 serves as a hollow channel in the valve body 21. The first ventilation end 243 serves as a through hole, and the cavity 201 is in communication with the through hole. The first ventilation end 243 is in communication with the second ventilation end 244, and the second ventilation end 244 is located between the peripheral edge 231 of the valve cover 23 and the outer ring 212 and exposed to outside. In this way, the pressure balance inside the cavity 201 can be achieved, and the pressure difference between the inside and the outside of the cavity 201 can be ensured.

In some embodiments, the valve body 21 with the ventilation groove 24 is of an integrally formed structure.

In some embodiments, the valve body 21 with the ventilation groove 24 has an integral structure integrally formed by a mold, or may be formed by means of stamping or the like. In this way, the manufacturing process can be further simplified and the cost can be saved.

In some embodiments, the valve body 21 may be a ring-shaped metal valve body, and then the metal valve body is formed into the ventilation groove 24 by laser grooving, laser cutting, etc., which is not limited herein.

Embodiments of the present disclosure also provide a battery including the top cover for the battery 100 and a housing on which the top cover for the battery 100 is disposed.

In the battery according to embodiments of the present disclosure, by partially covering the ventilation groove 24 with the valve cover 23, the pressure inside of the cavity 201 can be balanced, which can ensure the pressure difference between the inside and outside of the cavity 201, thereby ensuring accurate initiation pressure and effectiveness of the burst pressure of the explosion-proof valve 20 and improving the explosion-proof performance of the explosion-proof valve 20.

In some embodiments, the battery includes a cell, and the housing is a battery cell housing of the cell. In this way, the top cover for the battery 100 is disposed on the battery cell housing. Under abnormal circumstances inside of the battery cell, such as a short circuit caused by an external impact, the pressure inside of the battery cell will increase, and when the pressure of the battery cell rises to a certain level, the explosion-proof diaphragm 22 may be opened, which can ensure the safety of the battery to avoid explosions. The ventilation groove 24 is formed on the upper surface of the valve body 21, and can ensure the pressure balance in the cavity 201. The ventilation groove 24 can avoid excessive pressure acting on the valve cover 23, thereby ensuring the normal blasting of the explosion-proof diaphragm 22. In some embodiments, the battery includes a plurality of cells, and accordingly a plurality of top covers for battery 100 is disposed on the plurality of battery cell housings.

Embodiments of the present disclosure also provide an energy storage device including one or more batteries.

In the energy storage device according to the embodiments of the present disclosure, by partially covering the ventilation groove 24 with the valve cover 23, the pressure inside of the cavity 201 can be balanced, which can ensure the pressure difference between the inside and the outside of the cavity 201, thereby ensuring accurate initiation pressure and the effectiveness of the burst pressure of the explosion-proof valve 20 and improving the explosion-proof performance of the explosion-proof valve 20.

In some embodiments, the energy storage device may include a plurality of batteries. That is, in some embodiments, the energy storage device may include 1, 2, 3, 4 or more than 4 batteries, which is not limited herein. In an embodiment, the energy storage device may include 4 batteries arranged in a row in a vertical direction. The batteries may be connected in series or in parallel, which is not limited herein. The energy storage device formed by the plurality of batteries has a stronger energy storage effect and can satisfy requirements of the user. The energy storage device can be formed in the form of a household energy storage cabinet or small container.

It should be noted that the examples and specific numerical values as described above are merely for the convenience of illustrating the implementation of the present disclosure, and should not be construed as limiting the scope of the present disclosure.

In the description of this specification, reference to the terms "one embodiment," "some embodiments," "exemplary embodiment," "example," "specific example," or "some examples" or the like means that a particular feature, structure, material, or characteristic described in conjunction with the embodiments or examples is included in at least one embodiment or example of the present disclosure. In this specification, the schematic representations of the above terms do not necessarily refer to the same embodiment or example. Furthermore, the particular features, structures, materials or characteristics as described may be combined in one or more embodiments or examples in any suitable manner.

Although the embodiments of the present disclosure have been shown and described above, it should be understood that the above embodiments are exemplary and should not be construed as limitations on the present disclosure. Variations, modifications, substitutions and alternatives can be made to the embodiments as described above by those of ordinary skill in the art within the scope of the present disclosure.

What is claimed is:

1. A top cover for a battery, comprising:

a mounting sheet having an opening defined therein; and an explosion-proof valve comprising:

- a valve body mounted in the opening, wherein the valve body has a ventilation groove defined on an upper surface thereof;
- an explosion-proof diaphragm mounted on a lower surface of the valve body; and a valve cover mounted on the upper surface of the valve body, wherein a cavity is defined by the valve body, the explosion-proof diaphragm, and the valve cover and is in communication with an outside of the battery through the ventilation groove;

the valve body is of an annular structure and comprises an inner ring and an outer ring, the inner ring being in communication with the outer ring through the ventilation groove; and the ventilation groove has a first ventilation end defined in the inner ring of the valve body to be in communication with the cavity and a second ventilation end located between a peripheral edge of the valve cover and the outer ring of the valve body, wherein the valve cover is configured to only partially cover the ventilation groove in a direction from the inner ring to the outer ring of the valve body, and wherein in the direction from the inner ring to the outer ring of the valve body, a distance between a peripheral edge of the valve cover and the outer ring ranges from 0.5 mm to 3.0 mm.

2. The top cover for the battery according to claim 1, wherein the ventilation groove is V-shaped.

3. The top cover for the battery according to claim 2, wherein the ventilation groove has a first surface and a second surface that are perpendicular to each other, the first surface having a first edge and a second edge that extend in a length direction of the ventilation groove, the second surface having a third edge and a fourth edge that extend in the length direction of the ventilation groove, wherein the first edge is parallel to the third edge, and wherein the second edge abuts with the fourth edge.

4. The top cover for the battery according to claim 2, wherein the ventilation groove has a maximum sectional length of 0.2 mm in a width direction of the ventilation groove and a depth of 0.1 mm.

5. The top cover for the battery according to claim 1, wherein the valve body with the ventilation groove is of an integrally formed structure.

6. A battery, comprising:

a housing; and top cover for the battery, the top cover for the battery comprising:

a mounting sheet having an opening defined therein; and an explosion-proof valve comprising:

a valve body mounted in the opening, wherein the valve body has a ventilation groove defined on an upper surface thereof;

an explosion-proof diaphragm mounted on a lower surface of the valve body; and a valve cover mounted on the upper surface of the valve body, wherein a cavity is defined by the valve body, the explosion-proof diaphragm, and the valve cover and is in communication with an outside of the battery through the ventilation groove;

the valve body is of an annular structure and comprises an inner ring and an outer ring, the inner ring being in communication with the outer ring through the ventilation groove; and the ventilation groove has a first ventilation end defined in the inner ring of the valve body to be in communication with the cavity and a second ventilation end located between a peripheral edge of the valve cover and the outer ring of the valve body, wherein the valve cover is configured to only partially cover the ventilation groove in a direction from the inner ring to the outer ring of the valve body, and wherein in the direction from the inner ring to the outer ring of the valve body, a distance between a peripheral edge of the valve cover and the outer ring ranges from 0.5 mm to 3.0 mm.

7. The battery according to claim 6, wherein the ventilation groove is V-shaped.

8. The battery according to claim 7, wherein the ventilation groove has a first surface and a second surface that are perpendicular to each other, the first surface having a first edge and a second edge that extend in a length direction of the ventilation groove, the second surface having a third edge and a fourth edge that extend in the length direction of the ventilation groove, wherein the first edge is parallel to the third edge, and wherein the second edge abuts with the fourth edge.

9. The battery according to claim 7, wherein the ventilation groove has a maximum sectional length of 0.2 mm in a width direction of the ventilation groove and a depth of 0.1 mm.

10. The battery according to claim 6, wherein the valve body with the ventilation groove is of an integrally formed structure.

11. An energy storage device, comprising a battery, the battery comprising:

a housing; and top cover for the battery, the top cover for the battery comprising:

a mounting sheet having an opening defined therein; and an explosion-proof valve comprising:

a valve body mounted in the opening, wherein the valve body has a ventilation groove defined on an upper surface thereof;

an explosion-proof diaphragm mounted on a lower surface of the valve body; and a valve cover mounted on the upper surface of the valve body, wherein a cavity is defined by the valve body, the explosion-proof diaphragm, and the valve cover and is in communication with an outside of the battery through the ventilation groove;

the valve body is of an annular structure and comprises an inner ring and an outer ring, the inner ring being in communication with the outer ring through the ventilation groove; and the ventilation groove has a first ventilation end defined in the inner ring of the valve body to be in communication with the cavity and a second ventilation end located between a peripheral edge of the valve cover and the outer ring of the valve body, wherein the valve cover is configured to only partially cover the ventilation groove in a direction from the inner ring to the outer ring of the valve body, and wherein in the direction from the inner ring to the outer ring of the valve body, a distance between a peripheral edge of the valve cover and the outer ring ranges from 0.5 mm to 3.0 mm.

12. The energy storage device according to claim 11, wherein the ventilation groove is V-shaped.

13. The top cover for the battery according to claim 1, wherein in the direction from the inner ring to the outer ring of the valve body, the distance between the peripheral edge of the valve cover and the outer ring is selected from one of 0.5 mm, 1.0 mm, 1.5 mm, 1.7 mm, 2.2 mm, or 3.0 mm.

14. The battery according to claim 6, wherein in the direction from the inner ring to the outer ring of the valve body, the distance between the peripheral edge of the valve cover and the outer ring is selected from one of 0.5 mm, 1.0 mm, 1.5 mm, 1.7 mm, 2.2 mm, or 3.0 mm.

15. The energy storage device according to claim 11, wherein in the direction from the inner ring to the outer ring of the valve body, the distance between the peripheral edge of the valve cover and the outer ring is selected from one of 0.5 mm, 1.0 mm, 1.5 mm, 1.7 mm, 2.2 mm, or 3.0 mm.

* * * * *